Dec. 24, 1963 D. O. BARD 3,115,372
HYDRODYNAMIC TYPE BEARING
Filed Feb. 7, 1962 2 Sheets-Sheet 1
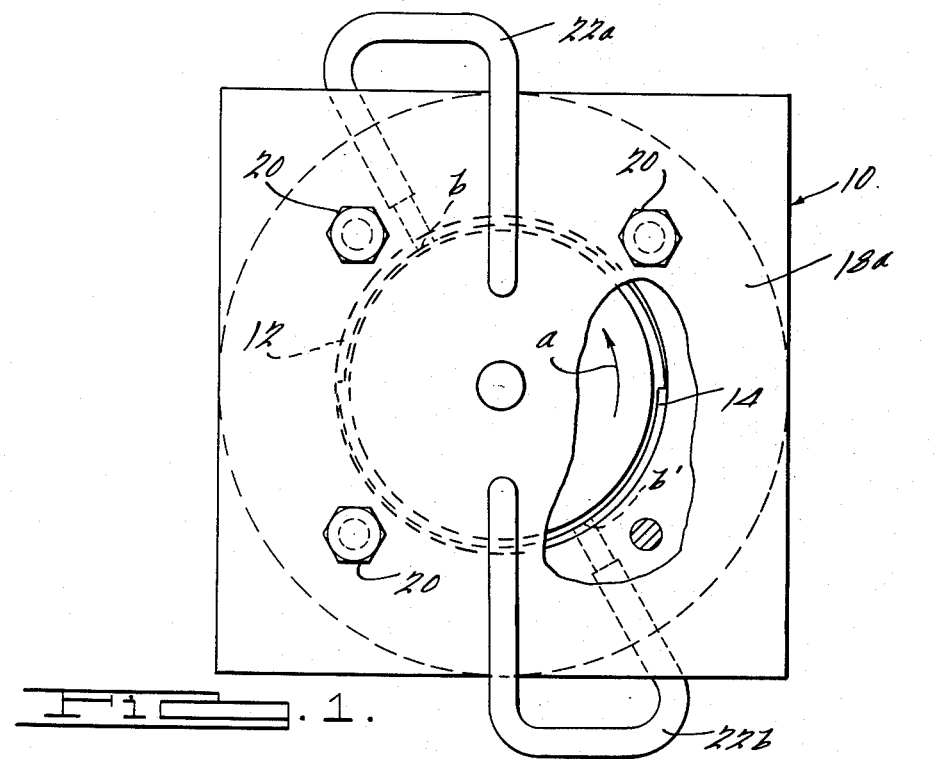
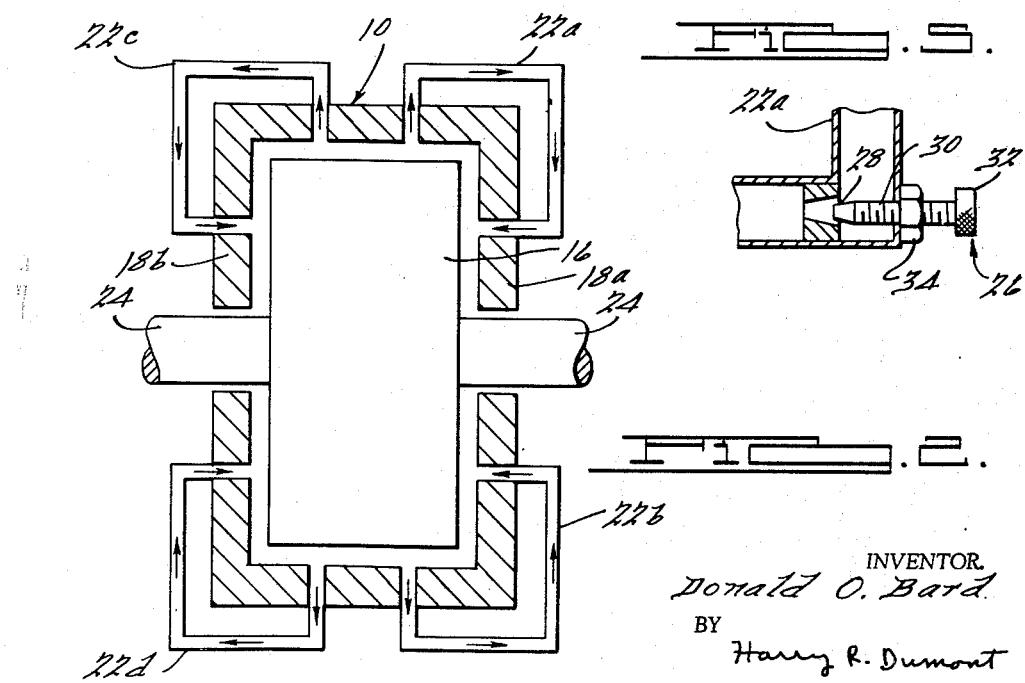
INVENTOR.
Donald O. Bard
BY Harry R. Dumont
ATTORNEY.

Dec. 24, 1963    D. O. BARD    3,115,372
HYDRODYNAMIC TYPE BEARING
Filed Feb. 7, 1962    2 Sheets-Sheet 2

INVENTOR.
Donald O. Bard,
BY
Harry R. Dumont
ATTORNEY.

# United States Patent Office 3,115,372
Patented Dec. 24, 1963

3,115,372
HYDRODYNAMIC TYPE BEARING
Donald O. Bard, Macomb Township, Macomb County, Mich., assignor to Chrysler Corporation, Highland Park, Mich., a corporation of Delaware
Filed Feb. 7, 1962, Ser. No. 171,695
6 Claims. (Cl. 308—9)

This invention relates generally to fluid bearings for rotating shafts, and, more particularly, to thrust stabilized bearings of the hydrodynamic gas lubricated type.

In the operation of hydrodynamic gas lubricated bearings of the wedge type, a radial pressure pattern is formed in which the radial pressure pattern is typically much greater in magnitude than the pressure pattern in the thrust direction. As a result the radial load capacity is greater than the thrust loading whereby a difference in bearing stiffness results. This relative difference in bearing stiffness causes undesirable effects when such a bearing is incorporated in precision type mechanisms as for example gyroscopes, and the like, where drift in the thrust direction may be a critical factor.

Accordingly, it is an object of this invention to provide a hydrodynamic gas lubricated bearing in which both radial and thrust balanced bearing stiffness may be maintained.

It is an additional object of this invention to provide a hydrodynamic gas lubricated bearing in which the bearing stiffness in the thrust direction may be readily adjusted to conform with load requirements.

It is a further object of this invention to provide a hydrodynamic gas lubricated bearing having increased radial and thrust load capacity.

In accordance with the foregoing objects and others, the present invention, first briefly described, comprises a hydrodynamic gas lubricated bearing of the wedge type in which a conduit is tapped at a point of relatively high pressure generated by the rotating member in cooperation with the wedge and transmitted in a force balanced relationship against the ends of the rotating member, that is, in a thrust direction.

To illustrate the present invention and its mode of operation, reference may be made to the accompanying drawings, in which:

FIGURE 1 is an end view of a hydrodynamic wedge bearing with parts broken away to show the detail of internal construction;

FIGURE 2 is a schematic drawing showing the operational pressure flow directions;

Figure 3:
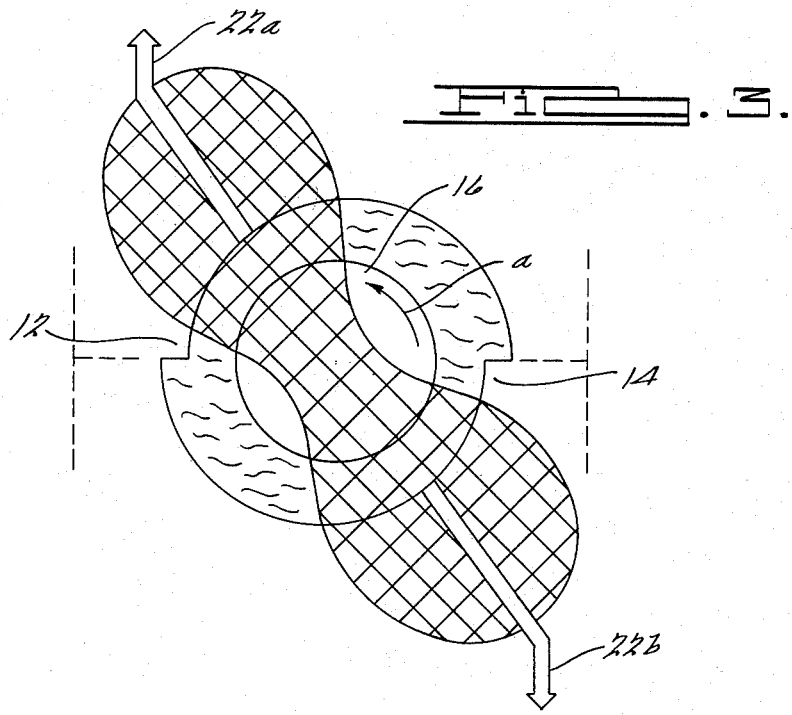
FIGURE 3 is a pressure flow diagram illustrating the areas of maximum pressure existing in the radial direction of a hydrodynamic wedge type bearing.

FIGURE 1 shows the housing 10 which has a longitudinal bore formed therein. A pair of lands 12 and 14 are further formed on the internal circumference of the bore of the housing. Lands 12 and 14 are seen to have a gradually increasing height in the direction of rotation of a rotor 16 which is indicated by an arrow $a$ as being counterclockwise. A pair of end plates 18$a$ and 18$b$ are mounted at either end of housing 10 by bolts 20. A portion of the end plate 18$a$ of the housing 10 is broken away to illustrate the manner of formation of the lands 12 and 14 near one of their points of intersection. A pair of conduits are provided at each end of housing 10 which are numbered 22$a$ and 22$b$, 22$c$ and 22$d$, respectively. Conduits 22$a$ and 22$b$ are provided which communicate between points $b$ and $b'$ located on the circumference of the bore of the housing, and extending through lands 12 and 14, respectively. Points $b$ and $b'$ are selected as being proximate an area of greatest height of the respective opposing lands 12 and 14. Conduits 22$a$ and 22$b$ at their other ends extend through the end plate 18$a$ of the housing 10. The inlets of conduits 22$a$ and 22$b$ through the end plate 18$a$ are equally spaced from the center of the end plate 18$a$ and diametrically opposite to provide balanced forces against the thrust surfaces of rotor 16. Conduits 22$c$ and 22$d$ are similarly placed with respect to lands 12 and 14 and with respect to end plate 18$b$ at the other end of the housing 10.

Rotor 16 is in the form of a cylindrical enlarged portion formed on shaft 24 with flat thrust faces on either end which lie in planes substantially parallel and slightly spaced from their respective end plates 18$a$ and 18$b$ on housing 10.

FIGURE 2 illustrates the flow of pressure from the radial portion of the housing 10 through the conduits 22$a$, $b$, $c$, and $d$, to the end plates 18$a$ and 18$b$ of the housing 10, and against the thrust faces of the cylindrically enlarged rotor portion 16 of the shaft 24. To provide a proper force balancing relationship at both ends of the rotor, two pairs of conduits, 22$a$ and 22$b$, 22$c$ and 22$d$ are utilized in the manner described in connection with FIGURE 1 hereinbefore. To permit the hydrodynamic wedge action, it will be observed that a mechanical clearance is provided between the lands 12 and 14 on the housing 10 at their greatest height and the rotor 16. For purposes of illustration, it will be recognized that the mechanical clearance existing between the rotor 16 and the housing 10 in both the radial and thrust directions has been greatly exaggerated.

FIGURE 3 illustrates the radial pressure pattern shown by shading as it exists during the normal operation of a hydrodynamic wedge type bearing. It will be observed that the areas of maximum pressure occur near the area of maximum height of the lands. Accordingly, the conduits 22$a$, $b$, $c$, and $d$, are placed with their ends in the area which form the greatest takeoff pressure for transmitting and directing this pressure against the thrust ends of the rotor 16 as has been shown in connection with FIGURE 1 hereinbefore. A similar high pressure area exists in the thrust direction from the rotor. For purposes of simplifying the explanation of the present invention, it has been described in a manner utilizing only the radial pressure pattern. It will be appreciated by those skilled in the art that wedge configurations numbering more than the two-wedge type may be utilized to achieve the same results in operation.

Figure 4:
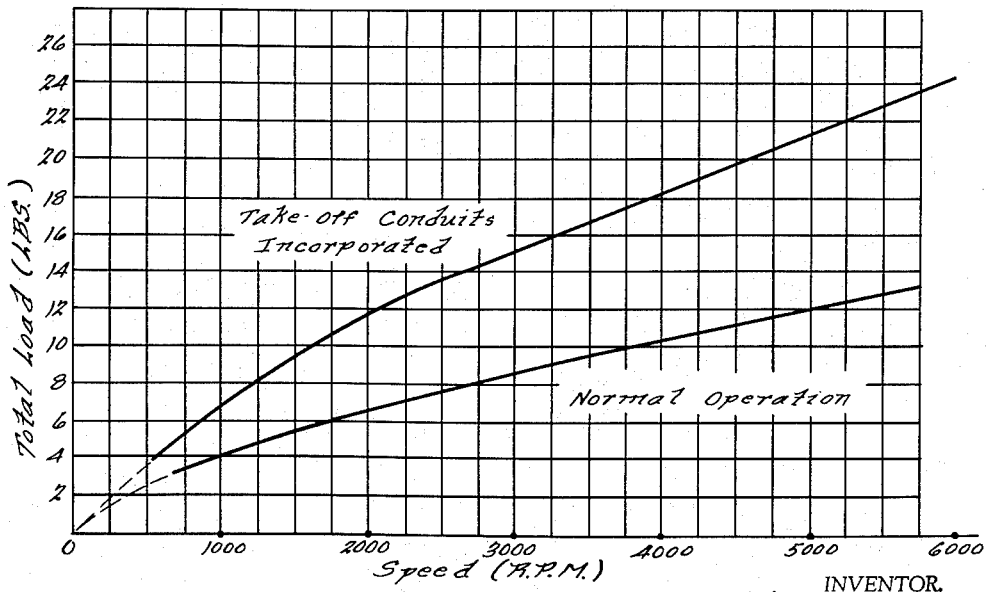
FIGURE 4 is a graph illustrating the effect upon radial load capacity of incorporation of the present invention in a wedge type hydrodynamic bearing; and, FIGURE 5 shows the means for controlling the flow of pressure through the conduits.

FIGURE 4 indicates that substantially increased load capacity in the radial direction is also achieved through the proper takeoff and loading of air pressures and flows within a hydrodynamic wedge bearing by incorporation of the present invention. In the normal operating range for one embodiment of the present invention, that is, at about 3000 r.p.m., it will be seen that the radial load capacity has been increased in the order of nearly 200%.

In the operation of a hydrodynamic gas bearing of the type hereinbefore described, operational requirements of the system in which it is utilized may demand a selective variance of the thrust stiffness characteristics of the bearing. With the present invention, the selective determination and adjustment of this characteristic may be readily achieved. I accomplish this by incorporating in conduits 22$a$, $b$, $c$, and $d$ a mean for varying the cross-sectional area of their outlets in end plates 18$a$ and 18$b$. By varying the cross-sectional area of these conduits, it will be seen that the takeoff pressure exerted in the thrust direction is properly controlled. For this purpose I provide, in the manner shown in FIGURE 5, a manipulative valve 26. The valve 26 includes a plunger with a tapered end portion 28, an intermediate threaded portion 30, and a knurled head 32. Threaded portion 30 threadably engages an internally threaded projection 34 of its conduit so that rotation of head 32 serves to advance or withdraw tapered end portion 28 to selectively change the cross-sectional area of the conduit 22a, b, c or d.

It will thus be seen that by the present invention I have provided a hydrodynamic gas bearing of the wedge type which exhibits improved bearing stiffness in both the thrust and the radial directions and have substantially increased the radial load capacity of the bearing.

I claim:

1. An air bearing comprising a housing having a long bore therein, a rotor shaft journalled for rotation therein, an enlarged cylinder portion of said shaft mounted with a mechanical clearance between its thrust faces and the ends of said housing, said housing having a plurality of lands on the internal circumference thereof parallel to the axis of rotation of said shaft, said lands being progressively greater in height in the direction of rotation of said rotor shaft, and a conduit extending through said housing between a point proximate an area of maximum height of said lands intermediate the ends of said housing and a point opposed to the thrust surface of said cylinder portion of said rotor shaft.

2. An air bearing comprising a housing having a long bore therein, a rotor shaft journalled for rotation therein, an enlarged cylinder portion of said shaft mounted with a mechanical clearance between its thrust faces and the ends of said housing, said housing having a pair of lands on the internal circumference thereof parallel to the axis of rotation of said shaft, said lands being progressively greater in height in the direction of rotation of said rotor shaft, a first pair of conduits, said conduits extending through said housing between points proximate an area of maximum height of a different one of said lands and points diametrically opposite and equidistant from the center of one thrust face of said cylinder portion and a second pair of conduits extending through said housing and oriented similarly to said first pair of conduits between said lands and the other thrust face of said cylinder portion.

3. An air bearing comprising a housing having a long bore therein, a rotor shaft journalled for rotation therein, an enlarged cylinder portion of said shaft mounted with a mechanical clearance between its thrust faces and the ends of said housing, said housing having a plurality of lands on the internal circumference thereof parallel to the axis of rotation of said shaft, said lands being progressively greater in height in the direction of rotation of said rotor shaft, a conduit extending through said housing between points proximate the radial and thrust surfaces of said cylinder portion of said rotor shaft, and means operatively connected to said conduit for varying the cross-sectional area of said conduit.

4. An air bearing comprising a housing having a long bore therein, a rotor shaft journalled for rotation therein, an enlarged cylinder portion of said shaft mounted with a mechanical clearance between its thrust faces and the ends of said housing, said housing having a pair of lands on the internal circumference thereof parallel to the axis of rotation of said shaft, said lands being progressively greater in height in the direction of rotation of said rotor shaft, a first pair of conduits, said conduits extending through said housing between points proximate an area of maximum height of a different one of said lands and points diametrically opposite and equidistant from the center of one thrust face of said cylinder portion, a second pair of conduits extending through said housing and oriented similarly to said first pair of conduits between said lands and the other thrust face of said cylinder portion, and means mounted proximate said ends of said housing and operatively connected to said conduits for selectively varying their cross-sectional area.

5. A hydrodynamic air bearing comprising a housing having a longitudinal bore therein and end members closing each end of said bore with reduced openings through said end members, a rotor shaft journalled for rotation therein and extending through said openings in said end members, an enlarged cylindrical portion on said shaft positioned within said bore with a mechanical clearance between its end thrust faces and the inner surfaces of said end members, said housing having a plurality of lands on the internal circumference thereof parallel to the axis of rotation of said shaft and progressively greater in height in the direction of rotation of said rotor shaft, and means for transmitting radial pressure developed by rotation of said rotor to the thrust faces of said rotor comprising pressure conduit means connecting an area of maximum height of said lands intermediate the ends of said housing with an area opposed to said thrust faces of said rotor shaft.

6. A hydrodynamic air bearing as claimed in claim 5 and further characterized in that means for varying the cross-sectional area of said pressure conduit means is operatively connected to said pressure conduit means.

References Cited in the file of this patent

UNITED STATES PATENTS 3,026,150     Buckley et al. _____ Mar. 20, 1962

FOREIGN PATENTS 721,549     Great Britain _____ Jan. 5, 1955